United States Patent
Collins et al.

(10) Patent No.: US 10,177,801 B2
(45) Date of Patent: Jan. 8, 2019

(54) FLIP DEVICE CASE

(71) Applicant: Intel Corporation, Santa Clara, CA (US)

(72) Inventors: David M. Collins, San Francisco, CA (US); Douglas Satzger, Santa Clara, CA (US); Michael A. Hyde, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/757,983

(22) Filed: Dec. 26, 2015

(65) Prior Publication Data

US 2017/0187408 A1    Jun. 29, 2017

(51) Int. Cl.
*H04B 1/3888* (2015.01)

(52) U.S. Cl.
CPC .................. *H04B 1/3888* (2013.01)

(58) Field of Classification Search
CPC ............ H04M 1/7253; H04M 1/72527; G06F 1/1616; H04B 1/3888
USPC .......... 455/575.1, 575.8; 379/437, 451, 440; 361/679.26; D14/250
See application file for complete search history.

(56) References Cited

U.S. PATENT DOCUMENTS

| | | |
|---|---|---|
| D352,516 S | 11/1994 | Newman et al. |
| D526,851 S | 8/2006 | Groff et al. |
| D532,258 S | 11/2006 | Bardolet |
| D601,854 S | 10/2009 | Rubin |
| D641,352 S | 7/2011 | Flagiello et al. |
| D673,159 S | 12/2012 | McCarthy et al. |
| D681,583 S | 5/2013 | Park |
| D684,967 S | 6/2013 | Flagiello et al. |
| D691,104 S | 10/2013 | Park |
| D701,201 S | 3/2014 | Jiang |
| D705,775 S | 5/2014 | Canizares et al. |
| D714,286 S | 9/2014 | Kim et al. |
| 8,833,555 B2 * | 9/2014 | Bennett, Jr. ............ A45C 11/00 206/320 |
| D717,304 S | 11/2014 | Yturralde et al. |
| D722,050 S | 2/2015 | Moradian |
| D743,407 S | 11/2015 | Lin |
| D745,855 S | 12/2015 | Chu |

(Continued)

FOREIGN PATENT DOCUMENTS

| | | |
|---|---|---|
| CN | 202980585 U | 6/2013 |
| KR | 20140136538 A | 12/2014 |
| WO | 2013006294 A1 | 1/2013 |

OTHER PUBLICATIONS

Yang, Songnan, U.S. Appl. No. 62/180,951, filed Jun. 17, 2015, US Application, Drawings, and Acknowldgment Receipt dated Jun. 17, 2015 attached (23 pages), not yet published.

(Continued)

*Primary Examiner* — Julio Perez
(74) *Attorney, Agent, or Firm* — International IP Law Group, P.L.L.C.

(57) ABSTRACT

A flip device case for an electronic device is described herein. The flip device case includes a recess and a border. The recess is to receive the electronic device via an opening in the recess. The border is to be coupled with the recess and includes a plurality of flexible points. Manipulation of the border at one or more of the flexible points is to configure the flip device case in a position.

23 Claims, 13 Drawing Sheets

(56) References Cited

U.S. PATENT DOCUMENTS

| | | |
|---|---|---|
| D746,279 S | 12/2015 | Bajwa et al. |
| D746,280 S | 12/2015 | Bajwa et al. |
| D754,666 S | 4/2016 | Tiffen et al. |
| D755,175 S | 5/2016 | Bajwa et al. |
| D767,940 S | 10/2016 | Gross et al. |
| D768,638 S | 10/2016 | Lee et al. |
| 9,661,906 B2 * | 5/2017 | Diebel .................. A45C 11/00 |
| 2014/0265767 A1 * | 9/2014 | Fathollahi ............ H04B 1/3888 312/223.4 |
| 2015/0041505 A1 | 2/2015 | Fujioka |
| 2015/0097009 A1 | 4/2015 | Burgess et al. |
| 2015/0122850 A1 * | 5/2015 | Quehl ................... A45C 11/00 224/191 |
| 2015/0141095 A1 * | 5/2015 | Kim ................... H04M 1/0202 455/575.8 |
| 2015/0296946 A1 * | 10/2015 | Buechin ................ A45C 11/00 206/45.23 |

OTHER PUBLICATIONS

Collins et al., U.S. Appl. No. 29/505,644, filed Dec. 24, 2015, US Application, Drawings, and Acknowledgment Receipt dated Mar. 24, 2016 attached (26 pages), not yet published.

Collins et al., U.S. Appl. No. 29/505,634, filed Dec. 25, 2015, US Application, Drawings, and Acknowledgment Receipt dated Jan. 20, 2016 attached (11 pages), not yet published.

PCT International Search Report, PCT Application No. PCT/US2016/059032, dated Feb. 3, 2017, 3 pages.

* cited by examiner

100A

100B

300A

400A

500B

FLIP DEVICE CASE

TECHNICAL FIELD

The present techniques relate generally to the protection of electronic devices. More specifically, the present techniques relate generally to a flexible electronic device case that can be articulated into various configurations.

BACKGROUND ART

Electronic devices include laptops, notebooks, cellular phones, smart phones, tablets, phablets, and the like. Frequently, these electronic devices are highly portable and subject to damage via dropping of the device. Additionally, the electronic device are subject to use in a variety of configurations, such as a portrait mode or a landscape mode. The electronic devices are typically subject to protection against damage.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1A:
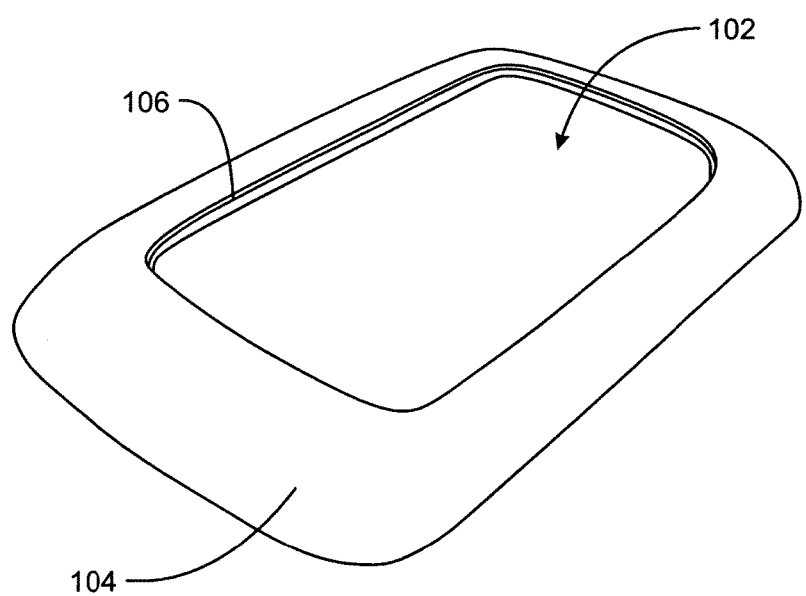
FIG. 1A is a top left perspective view of a flip device case.

Use of mobile, portable electronic devices include a risk of damage via dropping of the device. The risk is more pronounced with young users, such as small children. Traditionally, providing protection of the mobile electronic devices includes placing the device within a protective shell. In some cases, the protective shell may be hard, and can be shaped to precisely fit a particular mobile device. While a hard protective shell can protect the mobile device, these hard protective shells can also crack or be damaged when preventing damage to the mobile device. Additionally, hard protective cases typically only include a single mechanism for adjusting a viewpoint of the device. Further, hard protective cases may be hard to grasp, as the texture of the case can be either slick or abrasive. The difficulty in handling a hard protective shell may be especially noticeable among small children.

Embodiments described herein generally relate to a flip device case that enables configuration of the case such that a mobile device placed within the case can be positioned in any one of a plurality of viewing modes. In embodiments, a mobile device is placed within a defined area of the flip device case, and is protected from damage via a portion of the flip device case that surrounds the perimeter of the mobile device.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1A is a top left perspective view of a flip device case. The flip device case 100A includes a recess 102 that is used to secure an electronic device. In embodiments, the recess is a main opening, cavity, crevice, socket, opening, hollow, or hole that can firmly fit against the electronic device. A border 104 surrounds the recess 102. Additionally, a lip 106 is used to secure a mobile device in the recess 102. The flip device case 100A may be constructed from any material capable of a plurality of flexible points (flex-points). The flex points enable the border 104 to be configured into a variety of viewing positions and angles. In embodiments, the border 104 is constructed such that small hands of a child can be used to configure the border into a viewing position. As illustrated, the flip device case 100 is in a first position, where manipulation of the border 104 has not been applied to any flex-point.

Figure 1B:
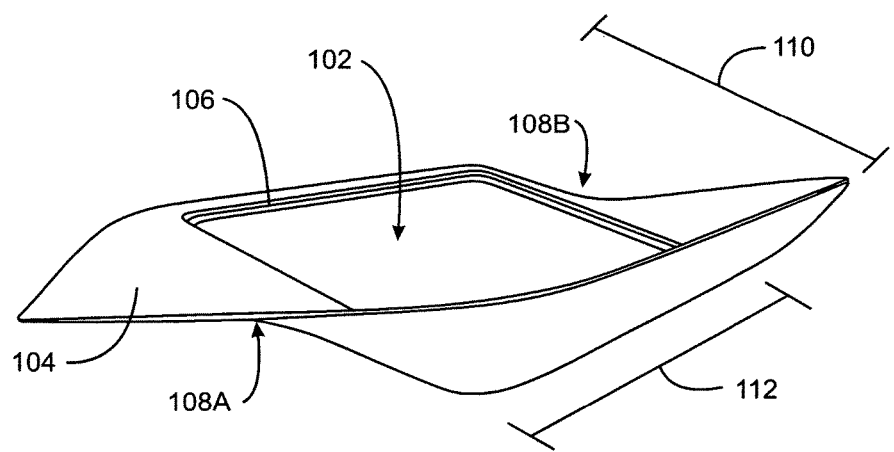
FIG. 1B is a top left perspective view of a flip device case configured at a plurality of flex-points.

FIG. 1B is a top left perspective view of a flip device case configured at a plurality of flex-points. The flip device case 100B includes a recess 102 that is used to secure an electronic device. A border 104 surrounds the recess 102. Additionally, a lip 106 is used to secure a mobile device in the recess 102.

The flip device case 100B may be constructed from any material capable of a plurality of flexible points (flex-points) 108. As illustrated, the flip device case 100B is configured into a second position by manipulation of the border 104 at flex-point 108A and flex-point 108B. In embodiments, manipulation of the border includes twisting or stretching at a flex-point. Although the flex-points 108A and 108B are illustrated as approximately halfway along an edge 110 of the border 104, the flex-points can occur at any point along the border 104. The edge 110 represents the width of the flip device case, and the edge 112 represents the length of the flip device case.

Figure 1C:
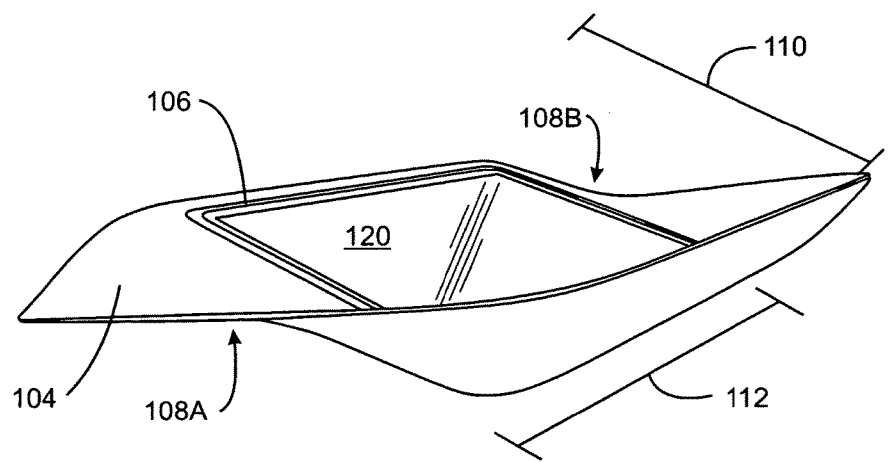
FIG. 1C is a top left perspective view of a flip device case configured at a plurality of flex-points with a device.

FIG. 1C is a top left perspective view of a flip device case configured at a plurality of flex-points with a device 120. The flip device case 100C includes a device 120 that has been inserted into a recess of the flip device case 100C. Additionally, a lip 106 is used to secure the mobile device 120 in a recess of the flip device case. A border 104 surrounds the mobile device 120.

The flip device case 100C may be constructed from any material capable of a plurality of flexible points (flex-points) 108. As illustrated, the flip device case 100C is configured into a second position by configuration of the border 104 at flex-point 108A and flex-point 108B. Although the flex-points 108A and 108B are illustrated as approximately halfway along an edge 110 of the border 104, the flex-points can occur at any position along the border 104. As illustrated, the configuration of the border 104 at the flex-points 108A and 108B has placed the flip device case in a second position. The second position enables the device 120 to be viewed in a landscape mode when a user views the device from the edge 120. In this exemplary configuration, the border 104 may be configured to form a "cup" along edge 112A of the border 104. Put another way, a long edge 112 has been lifted or raised while an opposite long edge is lowered. The cup may be preferred by users of the device 120, such as small children. The cup may enable additional locations that can be used to grasp the flip device case including the device 120.

Figure 1D:
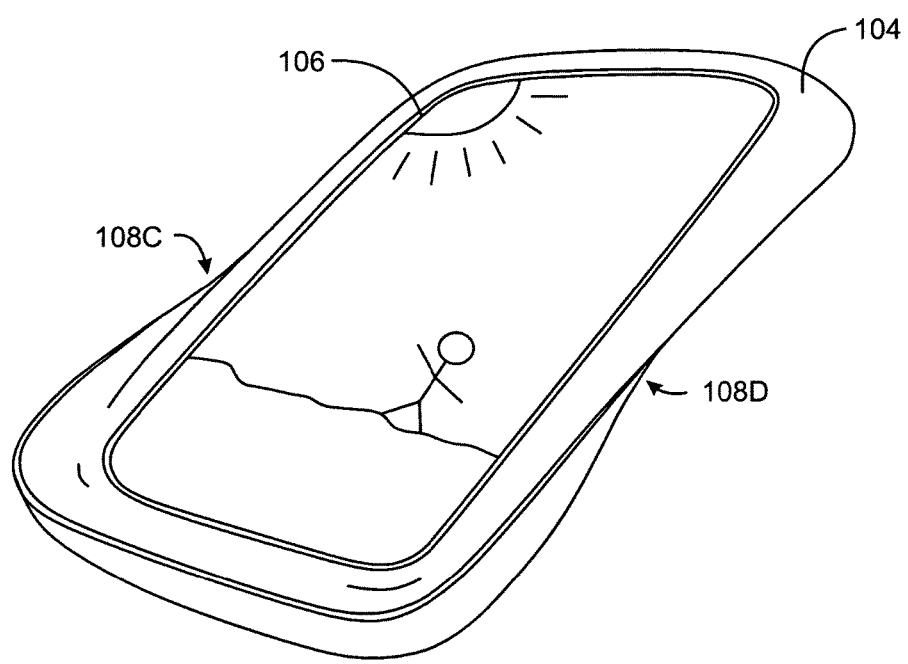
FIG. 1D is a top right perspective view of a flip device case configured at a plurality of flex-points with a device.

FIG. 1D is a top right perspective view of a flip device case configured at a plurality of flex-points with a device 120. The flip device case 100D includes a device 120 that has been inserted into a recess of the flip device case 100C. Additionally, a lip 106 is used to secure the mobile device 120 in a recess of the flip device case. A border 104 surrounds the mobile device 120.

The flip device case 100D may be constructed from any material capable of a plurality of flex-points 108. As illustrated, the flip device case 100D is configured into a second position by configuration of the border 104 at flex-point 108C and flex-point 108D. Although the flex-points 108C and 108D are illustrated as approximately halfway along an edge 112 of the border 104, the flex-points can occur at any point along the border 104. As illustrated, the configuration of the border 104 at the flex-points 108C and 108D has placed the flip device case in a third position. The third position enables the device 120 to be viewed in a portrait mode when a user views the device from the edge 110A. In this exemplary configuration, the border 104 may be configured to form a "cup" along edge 110A of the border 104.

In embodiments, the flip device case can be configured for at least six distinct orientations: a first portrait mode with a short end of the flip device case raised (as illustrated in FIG. 1D); a second portrait mode with an opposite short end of the flip device case raised; a first landscape mode with a long end of the flip device case raised (as illustrated in FIGS. 1B and 1C); a second landscape mode with an opposite long end of the flip device case raised; a lifted mode wherein the border of the flip device case are pointed downward to lift the electronic device (as illustrated in FIG. 1A); and a bowl mode wherein the border of the flip device case is pointed upward to surround the device.

In embodiments, the flip device case may be made of any material that can enable flex-points along a border of the flip device case. For example, the flip device case may be constructed from a plastic, such as silicone, vinyl, polyurethane. The material may be of any color, and may also be transparent or translucent. The material used to construct all of or at least a portion of the flip device case is stretchable enough to accommodate the insertion and removal of the electronic device, though elastic enough to return to its original shape after insertion of the device to protect the device during normal usage by a person. Thus, the flip device case can be stretched and configured in many different positions, including stretching to insert the electronic device, and can return to its original form. In embodiments, the material used to manufacture the flip device case may not be rigid enough to enable flex-points along the border. In such an embodiment, a reinforcement may be applied along all edges of the border 104 to enable support of the flex-points. The reinforcement may be any material capable of providing strength to a more flexible material.

Although the flip device case has been described as a single piece of flexible material, the flip device case may be formed from a plurality of materials joined together. For example, the recess 102 may be constructed from a hard protective shell, while the lip and border are constructed from a more flexible material capable of being manipulated into various positions at various flex-points along a border. Additionally, in embodiments, the recess may be a thicker flexible material when compared to the flexible material of the border 102. In this manner, the same material can be used during construction of the flip device case with added protection of the device while in the recess. Moreover, in embodiments, the flip device case may also be formed from leather, rubber, fiber, cloth, or metal.

The recess of the flip device case is considered a main opening of the flip device case. This cavity or space within the apparatus is used to hold an electronic device in place. The opening to receive the electronic device can be of any shape. Typically, the opening is to correspond to the shape of the electronic device. In embodiments, the opening is formed such that internal sides of the opening are to fit against an electronic device positioned in the opening in by tightly, firmly, or snugly wrapping the electronic device. In embodiments, a back portion of the recess or main opening of the flip device case may be not be present. In such a scenario, the back portion of an electronic device positioned in the recess or main opening is exposed. Moreover, the back portion of the recess or main opening may be reinforced with a hard material. The hard material may be hard as compared to the border and lip of the flip device case.

Figure 2:
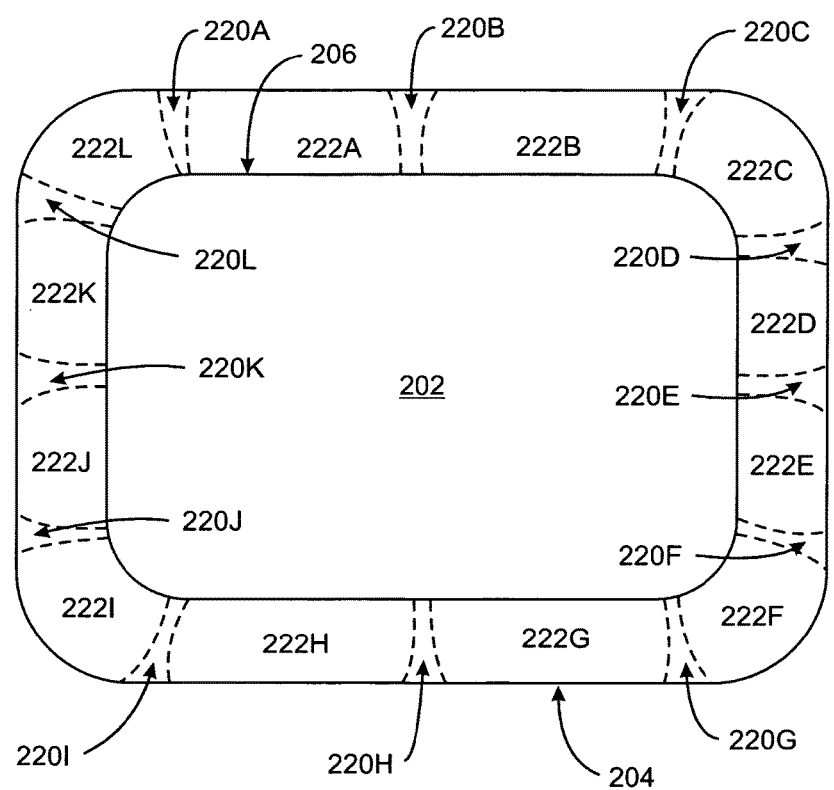
FIG. 2 is an illustration of a flip device case made of a rigid material.

FIG. 2 is an illustration of a flip device case made of a rigid material. The flip device case 200 includes a recess 202 that is used to secure an electronic device. A border 204 surrounds the recess 202. Additionally, a lip 206 is used to secure a mobile device in the recess 202. In embodiments, the border 204 of the flip device case may be constructed using a rigid material that is joined with a flexible material along the border to create pre-defined flex points along the border. Accordingly, areas 220A-220L each represent areas of flexible material that is physical coupled with regions 222A-222L of the border. The flexible material may expand and contract in order to enable flex-points at each of the areas 220A-220L.

In embodiments, the flip device case enables a fun and playful case for a child's tablet. In particular, the border and recess of the flip device case enables a flip capability which enables multiple configurations allowing the tablet to be utilized in various viewing and protective orientations. While traditional children's tablets are designed bulky and childlike as a means to withstand the punishment children will put them through, the flip device case enables protection that can be used with many different devices, including tablets not particularly designed for children. The flip device case is durable and playful, and encourages a child to leave the case on the device, thus providing the needed protection and allowing for a thin, sleek tablet. Moreover, the flip device case enables playful interaction at multiple viewing orientations.

Figure 3A:
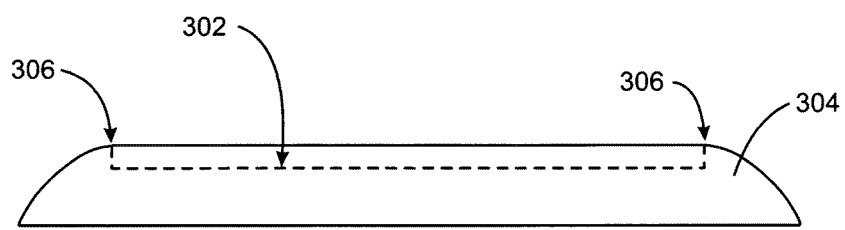
FIG. 3A is a side view of a flip device case.

FIG. 3A is a side view of a flip device case 300A. The flip device case 300A includes a recess 302 that is used to secure an electronic device. A border 304 surrounds the recess 302. Additionally, a lip 306 may be used to secure a mobile device in the recess 302. In FIG. 3A, the border 304 has been configured such that the recess 302 is lifted. In such a configuration, the recess 302 is higher than the border 304 when the flip device case 300A is placed on a flat surface positioned as illustrated.

Figure 3B:
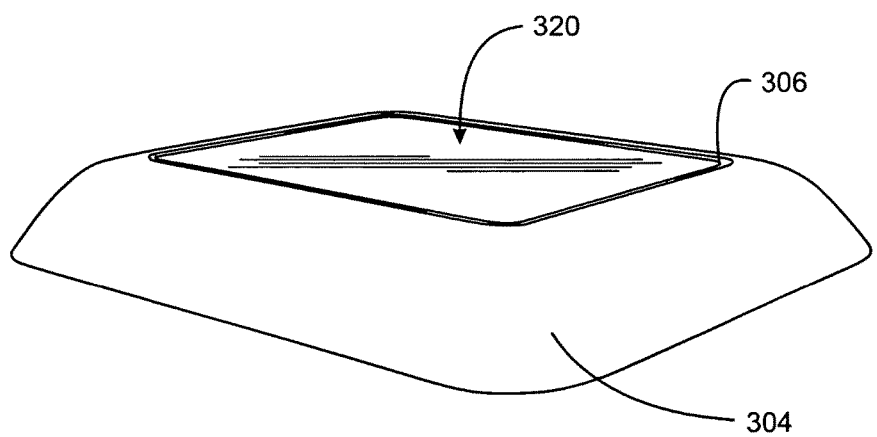
FIG. 3B is a top right perspective view of a flip device case with a device.

FIG. 3B is a top right perspective view of a flip device case 300B with a device 320. As illustrated, the flip device case 300B is positioned to lift the device 320 up and away from a surface on which the flip device case 300B may reset. In particular, the border 304 has been manipulated into a configuration that lifts the device 320.

Figure 4A:
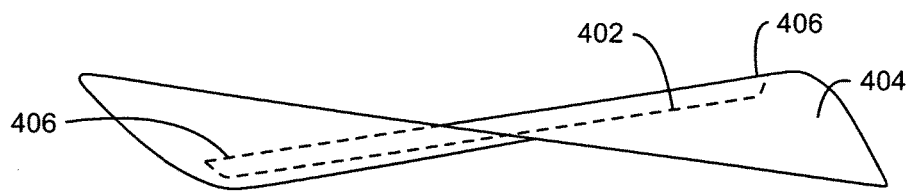
FIG. 4A is a side view of a flip device case.

FIG. 4A is a side view of a flip device case 400A. The flip device case 400A includes a recess 402 that is used to secure an electronic device. A border 404 surrounds the recess 402. Additionally, a lip 406 may be used to secure a mobile device in the recess 402. In FIG. 4A, the border 404 has been configured such that one end of the recess 402 is lifted. In such a configuration, the recess 402 is elevated on one side to enable a desirable viewing angle of a device when placed in the recess 402.

Figure 4B:
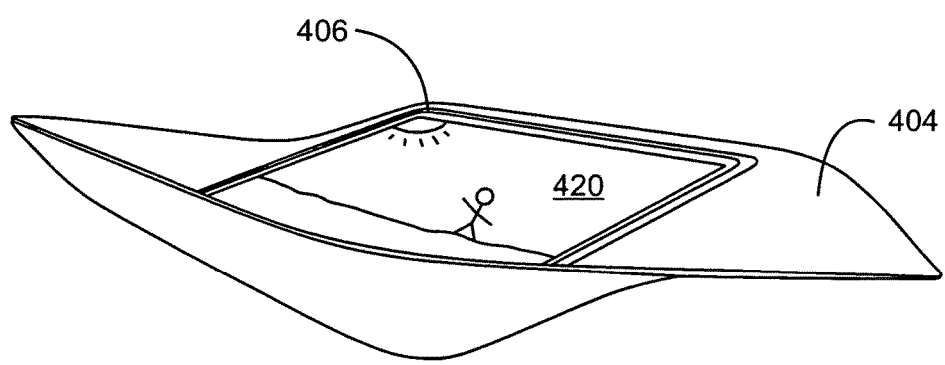
FIG. 4B is a top right perspective view of a flip device case with a device.

FIG. 4B is a top right perspective view of a flip device case 400B with a device 420. As illustrated, the flip device case 400B is positioned to lift one side the device 420 up and away from a surface on which the flip device case 400B may reset. In particular, the border 404 has been manipulated into a configuration that lifts one side of the device 420.

Figure 5A:
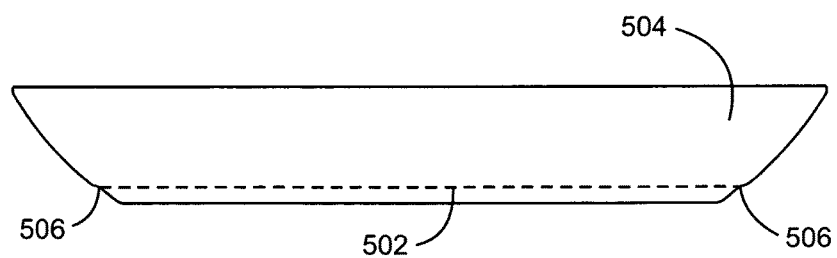
FIG. 5A is a side view of a flip device case.

FIG. 5A is a side view of a flip device case 500A. The flip device case 500A includes a recess 502 that is used to secure an electronic device. A border 504 surrounds the recess 502. Additionally, a lip 506 may be used to secure a mobile device in the recess 502. In FIG. 5A, the border 504 has been configured such that the recess 502 is contained in a bowl formed by the border 504. In such a configuration, the recess 502 is lower than the border 504 when the flip device case 500A is placed on a flat surface positioned as illustrated.

Figure 5B:
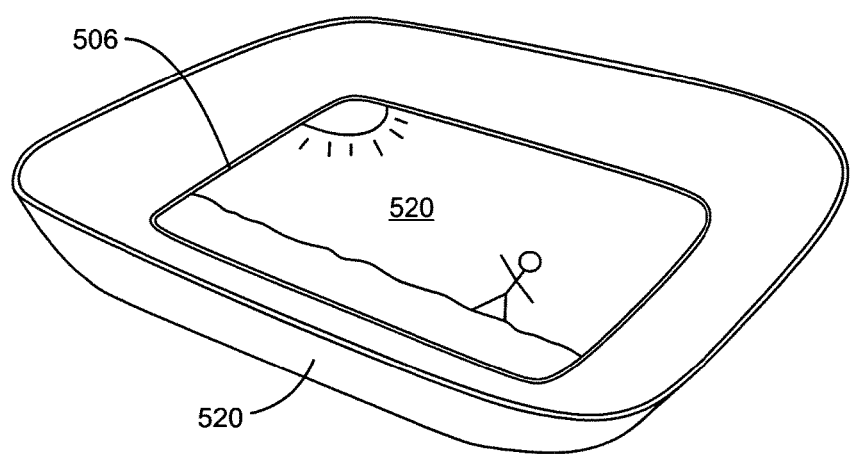
FIG. 5B is a top right perspective view of a flip device case with a device.

FIG. 5B is a top right perspective view of a flip device case 500B with a device 520. As illustrated, the flip device case 500B is positioned to sink the device 520 down onto a surface on which the flip device case 500B may reset. In particular, the border 504 has been manipulated into a configuration that forms a bowl around the device 520. Sound from the device may be amplified by the border surrounding the device by directing the sound up and away from the device. In embodiments, the border is used to direct sound from the device towards a user.

Figure 5C:
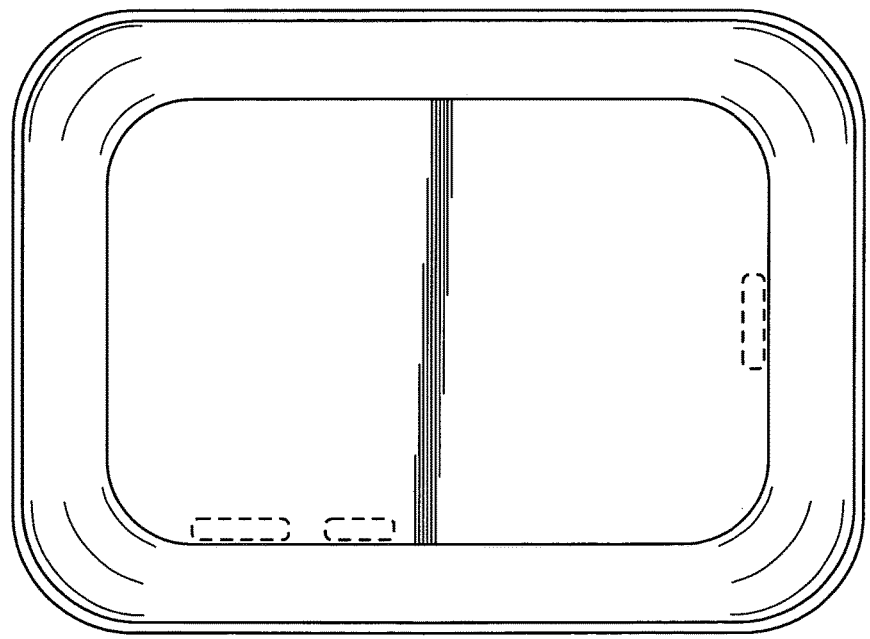
FIG. 5C is a bottom view of a flip device case with embossed buttons and/or openings.

FIG. 5C is a bottom view of a flip device case 500C with embossed buttons and/or openings. As illustrated, the recess of the flip device case 500C may include on or more embossed buttons or openings as illustrated by the dashed lines. An embossed button may correspond to the power or volume button on a device that is intended to be positioned in the flip device case. An opening may correspond to a location for power access and charging. In embodiments, the device may support wireless charging and no opening for power access and charging is located on the flip device case. The particular locations for embossed buttons and openings are shown for exemplary purposes and can be located at any location on the flip device case.

Although several particular positions of the flip device case have been illustrated, these positions in no way limit the configurations possible with the flip design case. For example, the flip design case may be configured such that any corner of the case points downward, while other corners of the case point upward. The flip device case can be configured depending on the context of use. For example, outdoors, a configuration such as that of FIGS. 5A and 5B can shield a display of the device from the sun, making it easier to view the display.

This flip device case enables a playful case designed for the tablet that will both protect it and provide encouragement to the child to leave the case on the device. In addition, this design enables multiple viewing angles for the tablet. In embodiments, the flip device case has no moving or separate mechanical parts. Accordingly, the flip device case can be injection molded and constructed from a single material. The flip functionality described herein enables multiple viewing angles, and can be positioned to protect the device while maintaining the multiple viewing angles. In embodiments, the flip device case can be configured for at least six distinct orientations: a first portrait mode with the short end of the device lifted; a second portrait mode with the opposite short end of the device lifted; a first landscape mode with the long end of the device lifted; a second landscape mode with the opposite long end of the device lifted; a lifted mode where all edges of the flip device case are pointed downward to lift the device; and a bowl mode where all edges of the flip device case are pointed upward to surround the device in a bowl fashion. The various positions enable differing tablet usage models, while also providing a playful feature to be enjoyed by a youthful end user. The flip device case can also create a more interactive experience for the youthful end user.

Figure 6:
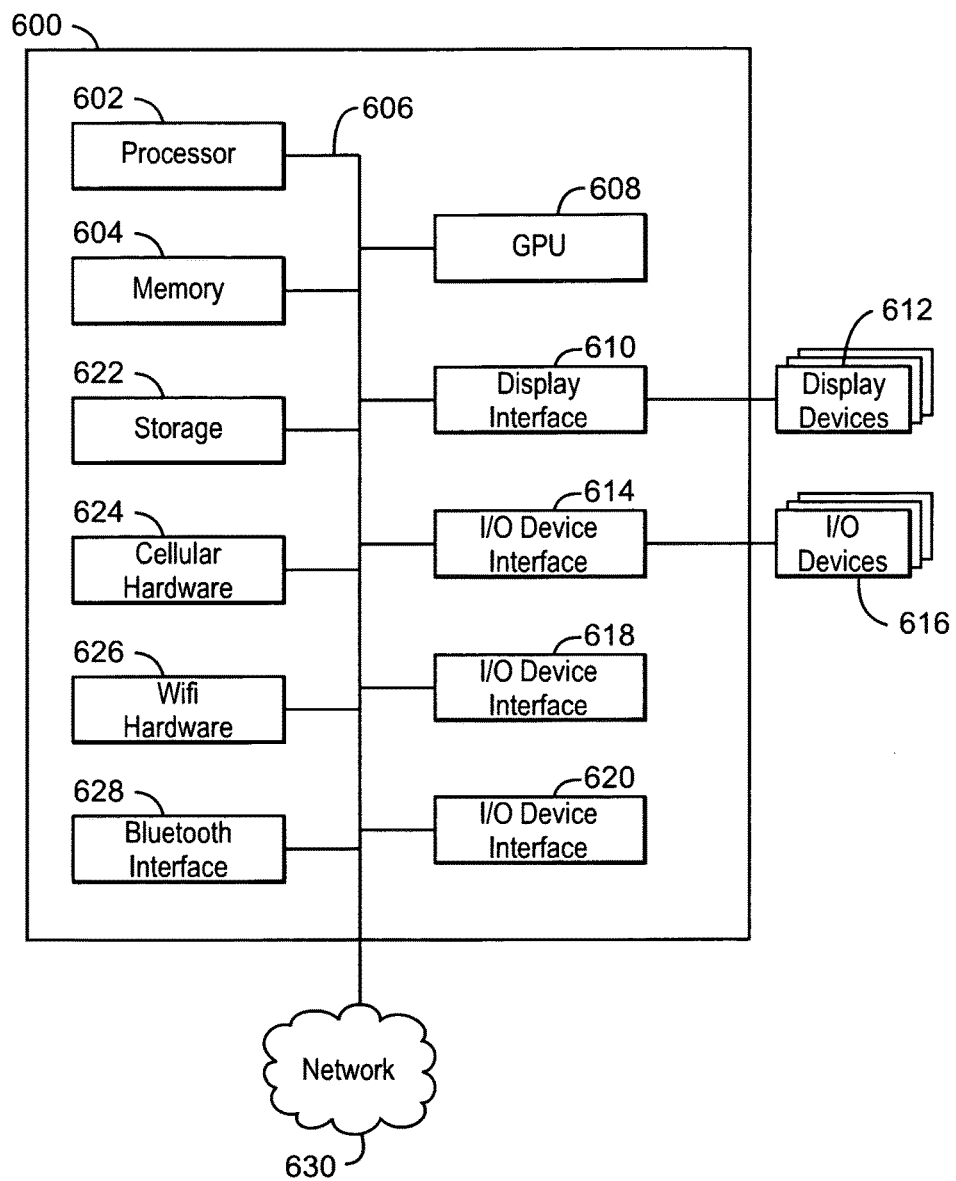
FIG. 6 is a block diagram of an electronic device that may be secured within a flip device case.

FIG. 6 is a block diagram of an electronic device that may be secured within a flip device case. The electronic device 600 may be, for example, a tablet, a phablet, a mobile phone, or a smart phone, among others. The electronic device 600 may include a central processing unit (CPU) 602 that is configured to execute stored instructions, as well as a memory device 604 that stores instructions that are executable by the CPU 602. The CPU may be coupled to the memory device 604 by a bus 606. Additionally, the CPU 602 can be a single core processor, a multi-core processor, a computing cluster, or any number of other configurations. Furthermore, the electronic device 600 may include more than one CPU 602. The memory device 604 can include random access memory (RAM), read only memory (ROM), flash memory, or any other suitable memory systems. For example, the memory device 604 may include dynamic random access memory (DRAM).

The electronic device 600 also includes a graphics processing unit (GPU) 608. As shown, the CPU 602 can be coupled through the bus 606 to the GPU 608. The GPU 608 can be configured to perform any number of graphics operations within the electronic device 600. For example, the GPU 608 can be configured to render or manipulate graphics images, graphics frames, videos, or the like, to be displayed to a user of the electronic device 600. In some embodiments, the GPU 608 includes a number of graphics engines, wherein each graphics engine is configured to perform specific graphics tasks, or to execute specific types of workloads.

The CPU 602 can be linked through the bus 606 to a display interface 610 configured to connect the electronic device 600 to a display device 612. The display device 612 can include a display screen that is a built-in component of the electronic device 600. The display device 612 can also include a computer monitor, television, or projector, among others, that is externally connected to the electronic device 600.

The CPU 602 can also be connected through the bus 606 to an input/output (I/O) device interface 614 configured to connect the electronic device 600 to one or more I/O devices 616. The I/O devices 616 can include, for example, a keyboard and a pointing device, wherein the pointing device can include a touchpad or a touchscreen, among others. The I/O devices 616 can be built-in components of the electronic device 600, or can be devices that are externally connected to the electronic device 600.

The electronic device 600 may also include a microphone array 618 and an image capture mechanism 620. In embodiments, the microphone array enables the electronic device 600 to capture sounds from a user. The image capture mechanism enables the device to capture still images or video. The flip device case is formed such that access to various features of a device secured in the case is not prevented. Accordingly, the flip device case may include various openings along the recess to enable access to ports of the device 600. For example, the flip device case may include openings for charging of the device 600 or openings that provide access to ports of I/O communication. Moreover, the recess may include openings to enable field of view of a lens for image capture mechanism.

The electronic device 600 also includes a storage device 622 that is a physical memory such as a hard drive, an optical drive, a flash drive, an array of drives, or any combinations thereof. The storage device 622 can store user data, such as audio files, video files, audio/video files, and picture files, among others. The storage device 622 can also store programming code such as device drivers, software applications, operating systems, and the like. The programming code stored to the storage device 622 may be executed by the CPU 602, GPU 608, or any other processors that may be included in the electronic device 600.

The CPU 602 may be linked through the bus 606 to cellular hardware 624. The cellular hardware 624 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 600 may access any network 630 without being tethered or paired to another device, where the network 630 is a cellular network.

The CPU 602 may also be linked through the bus 606 to WiFi hardware 626. The WiFi hardware is hardware according to WiFi standards (standards promulgated as Institute of Electrical and Electronics Engineers' (IEEE) 802.11 standards). The WiFi hardware 626 enables the wearable electronic device 600 to connect to the Internet using the Transmission Control Protocol and the Internet Protocol (TCP/IP), where the network 630 is the Internet. Accordingly, the electronic device 600 can enable end-to-end connectivity with the Internet by addressing, routing, transmitting, and receiving data according to the TCP/IP protocol without the use of another device. Additionally, a Bluetooth Interface 628 may be coupled to the CPU 602 through the bus 606. The Bluetooth Interface 628 is an interface according to Bluetooth networks (based on the Bluetooth standard promulgated by the Bluetooth Special Interest Group). The Bluetooth Interface 628 enables the electronic device 600 to be paired with other Bluetooth enabled devices through a personal area network (PAN). Accordingly, the network 630 may be a PAN. Examples of Bluetooth enabled devices include a laptop computer, desktop computer, ultrabook, tablet computer, mobile device, or server, among others.

The block diagram of FIG. 6 is not intended to indicate that the electronic device 600 is to include all of the components shown in FIG. 6. Rather, the computing system 600 can include fewer or additional components not illustrated in FIG. 6 (e.g., sensors, power management integrated circuits, additional network interfaces, etc.). The electronic device 600 may include any number of additional components not shown in FIG. 6, depending on the details of the specific implementation. Furthermore, any of the functionalities of the CPU 602 may be partially, or entirely, implemented in hardware and/or in a processor. For example, the functionality may be implemented with an application specific integrated circuit, in logic implemented in a processor, in logic implemented in a specialized graphics processing unit, or in any other device.

Example 1 is a flip device case for an electronic device. The electronic device includes a recess to surround the electronic device, the recess to receive the electronic device via an opening in the recess; and a border coupled with the recess and having a plurality of flexible points, wherein manipulation of the border at one or more of the flexible points is to configure the flip device case in a position.

Example 2 includes the electronic device of example 1, including or excluding optional features. In this example, the recess and the border are formed from single, continuous material. Optionally, the material is a plastic, including but not limited silicone, vinyl, polyurethane.

Example 3 includes the electronic device of any one of examples 1 to 2, including or excluding optional features. In this example, a lip is used to secure the electronic device in the recess.

Example 4 includes the electronic device of any one of examples 1 to 3, including or excluding optional features. In this example, the flip device case is to be configured in at least six distinct orientations.

Example 5 includes the electronic device of any one of examples 1 to 4, including or excluding optional features. In this example, the flip device case is to be configured in a first portrait mode with a short end of the flip device case raised.

Example 6 includes the electronic device of any one of examples 1 to 5, including or excluding optional features. In this example, the flip device case is to be configured in a second portrait mode with an opposite short end of the flip device case raised.

Example 7 includes the electronic device of any one of examples 1 to 6, including or excluding optional features. In this example, the flip device case is to be configured in a first landscape mode with a long end of the flip device case raised.

Example 8 includes the electronic device of any one of examples 1 to 7, including or excluding optional features. In this example, the flip device case is to be configured in a second landscape mode with an opposite long end of the flip device case raised.

Example 9 includes the electronic device of any one of examples 1 to 8, including or excluding optional features. In this example, the flip device case is to be configured in a lifted mode wherein the border of the flip device case are pointed downward to lift the electronic device.

Example 10 includes the electronic device of any one of examples 1 to 9, including or excluding optional features. In this example, the flip device case is to be configured in a bowl mode wherein the border of the flip device case is pointed upward to surround the device. Optionally, the recess, the border, and the lip are formed from a single, continuous material.

Example 11 is a protective case. The protective case includes a recess to receive an electronic device via an opening in the recess; a lip to secure the electronic device in the recess; and a border coupled with the recess and the lip, the border having a plurality of flexible points, wherein manipulation of the border at one or more of the flexible points is to configure the flip device case in a position.

Example 12 includes the protective case of example 11, including or excluding optional features. In this example, the recess, the border, and the lip are formed from single, continuous material. Optionally, the material is a plastic, including but not limited silicone, vinyl, polyurethane.

Example 13 includes the protective case of any one of examples 11 to 12, including or excluding optional features. In this example, the protective case is to be configured in at least six distinct orientations via the flexible points.

Example 14 includes the protective case of any one of examples 11 to 13, including or excluding optional features. In this example, the protective case is to be configured in a first portrait mode with a short end of the protective case raised.

Example 15 includes the protective case of any one of examples 11 to 14, including or excluding optional features. In this example, the protective case is to be configured in a second portrait mode with an opposite short end of the protective case raised.

Example 16 includes the protective case of any one of examples 11 to 15, including or excluding optional features. In this example, the protective case is to be configured in a first landscape mode with a long end of the protective case raised.

Example 17 includes the protective case of any one of examples 11 to 16, including or excluding optional features. In this example, the protective case is to be configured in a second landscape mode with an opposite long end of the protective case raised.

Example 18 includes the protective case of any one of examples 11 to 17, including or excluding optional features. In this example, the protective case is to be configured in a lifted mode wherein the border of the protective case are pointed downward to lift the electronic device.

Example 19 includes the protective case of any one of examples 11 to 18, including or excluding optional features. In this example, the protective case is to be configured in a bowl mode wherein the border of the protective case is pointed upward to surround the device. Optionally, sound from the device is amplified by the border surrounding the device by directing the sound up and away from the device.

Example 20 is a flip device case for an electronic device. The electronic device includes a recess to surround the electronic device, the recess to receive the electronic device via an opening in the recess; and a flexible means coupled with the recess, wherein manipulation of the flexible means at one or more of points is to configure the flip device case in a position.

Example 21 includes the electronic device of example 20, including or excluding optional features. In this example, the recess and the flexible means are formed from single, continuous material. Optionally, the material is a plastic, including but not limited silicone, vinyl, polyurethane.

Example 22 includes the electronic device of any one of examples 20 to 21, including or excluding optional features. In this example, a lip is used to secure the electronic device in the recess.

Example 23 includes the electronic device of any one of examples 20 to 22, including or excluding optional features. In this example, the flip device case is to be configured in at least six distinct orientations.

Example 24 includes the electronic device of any one of examples 20 to 23, including or excluding optional features. In this example, the flip device case is to be configured in a first portrait mode with a short end of the flip device case raised.

Example 25 includes the electronic device of any one of examples 20 to 24, including or excluding optional features. In this example, the flip device case is to be configured in a second portrait mode with an opposite short end of the flip device case raised.

Example 26 includes the electronic device of any one of examples 20 to 25, including or excluding optional features. In this example, the flip device case is to be configured in a first landscape mode with a long end of the flip device case raised.

Example 27 includes the electronic device of any one of examples 20 to 26, including or excluding optional features. In this example, the flip device case is to be configured in a second landscape mode with an opposite long end of the flip device case raised.

Example 28 includes the electronic device of any one of examples 20 to 27, including or excluding optional features. In this example, the flip device case is to be configured in a lifted mode wherein the flexible means of the flip device case are pointed downward to lift the electronic device.

Example 29 includes the electronic device of any one of examples 20 to 28, including or excluding optional features. In this example, the flip device case is to be configured in a bowl mode wherein the flexible means of the flip device case is pointed upward to surround the device. Optionally, the recess, the flexible means, and the lip are formed from a single, continuous material.

It is to be understood that specifics in the aforementioned examples may be used anywhere in one or more embodiments. For instance, all optional features of the electronic device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A flip device case for an electronic device, comprising:
a recess to surround the electronic device, the recess to receive the electronic device via an opening in the recess; and
a border coupled with the recess and having a plurality of flexible points, wherein manipulation of the border by twisting or stretching at one or more of the flexible points is to configure the flip device case in at least a portrait mode with a portion of the electronic device raised, and another manipulation of the border at one or more of the flexible points is to configure the flip device case in at least a landscape mode with another portion of the electronic device raised, wherein the manipulation and the another manipulation enables multiple viewing angles of the electronic device.

2. The flip device case of claim 1, wherein the recess and the border are formed from a single, continuous material.

3. The flip device case of claim 2, wherein the material is a plastic, including but not limited to silicone, vinyl, polyurethane.

4. The flip device case of claim 1, wherein a lip is used to secure the electronic device in the recess.

5. The flip device case of claim 4, wherein the recess, the border, and the lip are formed from a single, continuous material.

6. The flip device case of claim 1, wherein the flip device case is to be configured in at least six distinct orientations by manipulation of the border at one or more of the flexible points.

7. The flip device case of claim 1, wherein the flip device case is to be configured in a first portrait mode with a short end of the flip device case raised by manipulation of the border at one or more of the flexible points.

8. The flip device case of claim 1, wherein the flip device case is to be configured in a second portrait mode with an opposite short end of the flip device case raised by manipulation of the border at one or more of the flexible points.

9. The flip device case of claim 1, wherein the flip device case is to be configured in a first landscape mode with a long end of the flip device case raised by manipulation of the border at one or more of the flexible points.

10. The flip device case of claim 1, wherein the flip device case is to be configured in a second landscape mode with an opposite long end of the flip device case raised by manipulation of the border at one or more of the flexible points.

11. The flip device case of claim 1, wherein the flip device case is to be configured in a lifted mode wherein the border of the flip device case is pointed downward to lift the electronic device.

12. The flip device case of claim 1, wherein the flip device case is to be configured in a bowl mode wherein the border of the flip device case is pointed upward to surround the electronic device.

13. A protective case, comprising:
a recess to receive an electronic device via an opening in the recess;
a lip to secure the electronic device in the recess; and
a border coupled with the recess and the lip, the border having a plurality of flexible points, wherein manipulation of the border by twisting or stretching at one or more of the flexible points is to configure the protective case in at least a portrait mode with a portion of the electronic device raised, and another manipulation of the border at the one or more of the flexible points is to configure the protective case in at least a landscape mode with a portion of the electronic device raised, wherein the manipulation and the another manipulation enables multiple viewing angles of the electronic device.

14. The protective case of claim 13, wherein the recess, the border, and the lip are formed from a single, continuous material.

15. The protective case of claim 14, wherein the material is a plastic, including but not limited to silicone, vinyl, polyurethane.

16. The protective case of claim 13, wherein the protective case is to be configured in at least six distinct orientations via the flexible points.

17. The protective case of claim 13, wherein the protective case is to be configured in a first portrait mode with a short end of the protective case raised.

18. The protective case of claim 13, wherein the protective case is to be configured in a second portrait mode with an opposite short end of the protective case raised.

19. The protective case of claim 13, wherein the protective case is to be configured in a first landscape mode with a long end of the protective case raised.

20. The protective case of claim 13, wherein the protective case is to be configured in a second landscape mode with an opposite long end of the protective case raised.

21. The protective case of claim 13, wherein the protective case is to be configured in a lifted mode wherein the border of the protective case is pointed downward to lift the electronic device.

22. The protective case of claim 13, wherein the protective case is to be configured in a bowl mode wherein the border of the protective case is pointed upward to surround the electronic device.

23. The protective case of claim 22, wherein sound from the electronic device is amplified by the border surrounding the electronic device by directing the sound up and away from the electronic device.

* * * * *